US011919749B2

(12) United States Patent
Palberg et al.

(10) Patent No.: US 11,919,749 B2
(45) Date of Patent: Mar. 5, 2024

(54) CRANE, AND METHOD FOR CONTROLLING SUCH A CRANE

(71) Applicant: Liebherr-Components Biberach GmbH, Biberach an der Riß (DE)

(72) Inventors: Michael Palberg, Riedlingen (DE); Jürgen Resch, Degernau (DE); Oliver Fenker, Warthausen (DE)

(73) Assignee: Liebherr-Components Biberach GmbH, Biberach an der Riß (DE)

( * ) Notice: Subject to any disclaimer, the term of this patent is extended or adjusted under 35 U.S.C. 154(b) by 1283 days.

(21) Appl. No.: 16/092,550

(22) PCT Filed: Apr. 7, 2017

(86) PCT No.: PCT/EP2017/000450

§ 371 (c)(1),
(2) Date: Oct. 10, 2018

(87) PCT Pub. No.: WO2017/178106

PCT Pub. Date: Oct. 19, 2017

(65) Prior Publication Data

US 2019/0119078 A1 Apr. 25, 2019

(30) Foreign Application Priority Data

Apr. 11, 2016 (DE) ..................... 10 2016 004 350.4

(51) Int. Cl.
*B66C 13/06* (2006.01)
*B66C 23/16* (2006.01)

(52) U.S. Cl.
CPC ............ *B66C 13/063* (2013.01); *B66C 23/16* (2013.01)

(58) Field of Classification Search
CPC .............................. B66C 13/063; B66C 23/16
See application file for complete search history.

(56) References Cited

U.S. PATENT DOCUMENTS 3,153,486 A * 10/1964 Strnad ..................... B66C 23/32 414/564
6,826,452 B1 * 11/2004 Holland .................. B66C 23/00 700/245

(Continued)

FOREIGN PATENT DOCUMENTS

DE 4315005 A1 11/1994
DE 10064182 A1 5/2002

(Continued)

OTHER PUBLICATIONS

Communication pursuant to Article 94(3) EPC in related EP Application No. 17 721 521.7 dated Sep. 3, 2020.

(Continued)

*Primary Examiner* — Michael Collins
(74) *Attorney, Agent, or Firm* — Troutman Pepper Hamilton Sanders LLP; Ryan A. Schneider; Christopher C. Close, Jr.

(57) ABSTRACT

The present invention relates to a crane, in particular to a revolving tower crane, having a load suspension means attached to a hoist rope, drive devices for moving a plurality of crane elements and for traveling the load suspension means, a control apparatus for controlling the drive devices such that the load suspension means travels along a travel path, and an oscillation damping device for damping oscillation movements of the load suspension means, wherein said oscillation damping device has a control module for influencing the control of the drive devices in dependence on oscillation-relevant criteria. It is proposed not only to take account of the actual oscillation movement of the rope per se in the oscillation damping measures, but also the dynamics of the steel construction of the crane and its drivetrains.

18 Claims, 3 Drawing Sheets

(56) References Cited

U.S. PATENT DOCUMENTS

Figure 1:
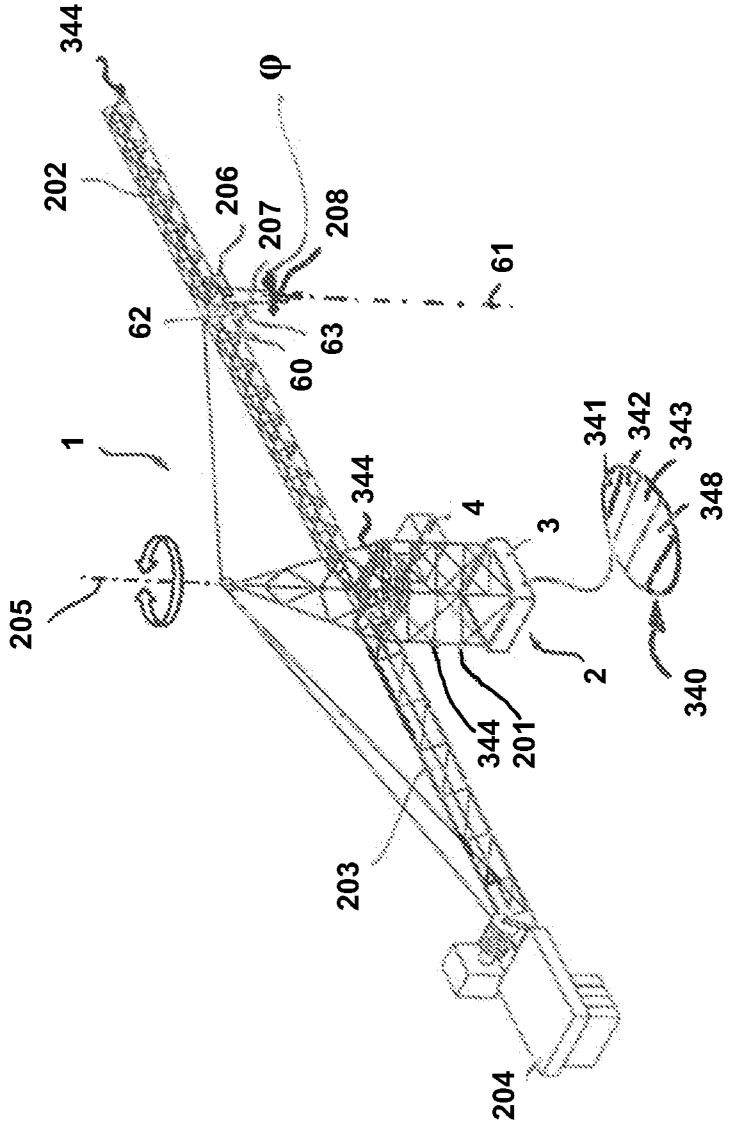

| | | | | |
|---|---|---|---|---|
| 8,025,167 | B2 * | 9/2011 | Schneider | B66C 13/063 212/276 |
| 8,195,368 | B1 * | 6/2012 | Leban | B63B 27/10 701/50 |
| 9,041,595 | B2 * | 5/2015 | Cameron | G01S 5/0284 342/146 |
| 9,238,570 | B2 * | 1/2016 | Schoonmaker | B66C 13/46 |
| 9,738,493 | B2 * | 8/2017 | Fenker | B66C 13/46 |
| 10,696,526 | B2 * | 6/2020 | Weckbecker | B66C 23/283 |
| 11,034,556 | B2 * | 6/2021 | Mayer | B66C 15/045 |
| 11,084,691 | B2 * | 8/2021 | Palberg | B66C 13/063 |
| 11,084,693 | B2 * | 8/2021 | Weckbecker | B66C 23/825 |
| 11,447,372 | B2 * | 9/2022 | Rauscher | B66C 13/066 |
| 2004/0164041 | A1 * | 8/2004 | Sawodny | B66C 13/085 212/273 |
| 2009/0008351 | A1 * | 1/2009 | Schneider | B66C 13/46 212/278 |
| 2010/0230370 | A1 * | 9/2010 | Schneider | B63B 27/10 212/276 |
| 2013/0013251 | A1 * | 1/2013 | Schoonmaker | B66C 15/04 702/152 |
| 2013/0161279 | A1 | 6/2013 | Schneider et al. | |
| 2013/0213919 | A1 * | 8/2013 | Kyllingstad | B66D 1/52 212/272 |
| 2015/0329333 | A1 * | 11/2015 | Fenker | B66C 23/022 212/225 |
| 2018/0044149 | A1 * | 2/2018 | Weckbecker | B66C 23/88 |
| 2018/0134528 | A1 * | 5/2018 | Oka | B66C 13/20 |

FOREIGN PATENT DOCUMENTS

| | | | |
|---|---|---|---|
| DE | 102009032270 | A1 | 1/2011 |
| DE | 202008018206 | U1 | 1/2012 |
| DE | 202008018260 | U1 | 5/2012 |
| DE | 102011001112 | A1 | 9/2012 |
| DE | 102012004739 | A1 | 9/2013 |
| DE | 102013012019 | A1 | 1/2015 |
| EP | 1880971 | A2 | 1/2008 |

OTHER PUBLICATIONS

Examination report under sections 12 & 13 of the Patents Act, 1970 and the Patents Rules, 2003 in related IN Application No. 201817035075 dated Mar. 4, 2021.

Schaper, U., et al. “A Load Position Observer for Cranes With Gyroscope Measurements,” XP002771861; Database Compendex [Online], Engineering Information, Inc., New York, NY, US, 2011; Database Accession No. E20124015493306; & IFAC Proceedings Volumes (IFAC-Papersonline)—Proceedings of the 18th IFAC World Congress 2011 IFAC Secretariat AUS, Bd. 18, Nr. Part 1, 2011, Seiten 3563-3568, DOI: 10.3182/20110828-6-IT-1002.01456, 1 page.

Siemens AG: “Simocrane Advanced Technology Sway Control,” Sep. 17, 2012, Seiten 1-2, XP055389077, Gefunden im Internet: URL:https://c4b.gss.siemens.com/resources/articles/e20001-a1010-p620-x-7600.pdf [gefunden am Jul. 7, 2017], 2 pages.

German Search Report for Application No. DE 10 2016 004 350.4 dated Jan. 25, 2017, 9 pages.

International Search Report and Written Opinion for International Application No. PCT/EP2017/000450 dated Jul. 21, 2017, 13 pages.

* cited by examiner a)

b)

c)

d)

e)

CRANE, AND METHOD FOR CONTROLLING SUCH A CRANE

The present invention relates to a crane, in particular to a revolving tower crane, having a load suspension means attached to a hoist rope, drive devices for moving a plurality of crane elements and for traveling the load suspension means, a control apparatus for controlling the drive devices such that the load suspension means travels along a travel path, and an oscillation damping device for damping oscillation movements of the load suspension means, wherein said oscillation damping device has a control module for influencing the control of the drive devices in dependence on oscillation-relevant criteria. The invention further also relates to a method of controlling a crane in which the control of the drive devices is influenced by an oscillation damping device in dependence on oscillation-relevant parameters.

To be able to travel the lifting hook of a crane along a travel path or between two destination points, various drive devices typically have to be actuated and controlled. For example with a revolving tower crane in which the hoist rope runs off from a trolley that is travelable at the boom of the crane, the slewing gear by means of which the tower with the boom or booms provided thereon are rotated about an upright axis relative to the tower, the trolley drive by means of which the trolley can be traveled along the boom, and the hoisting gear by means of which the hoist rope can be adjusted and thus the lifting hook can be raised and lowered typically respectively have to be actuated and controlled. Said drive devices are here typically actuated and controlled by the crane operator via corresponding operating elements such as in the form of joysticks, rocker switches, rotary knobs, and sliders and the like, which, as experience has shown, requires a lot of feeling and experience to travel to the destination points fast and nevertheless gently without any greater oscillation movements of the lifting hook. Whereas travel between the destination points should be as fast as possible to achieve high work performance, the stop at the respective destination point should be gentle without the lifting hook with the load lashed thereto continuing to oscillate.

Such a control of the drive devices of a crane is fatiguing for the crane operator in view of the required concentration, particularly since travel paths that repeat over and over and monotonous work have to be performed, for example, when a concrete skip suspended at the lifting hook has to be traveled to and fro multiple times during concreting between a concrete mixer at which the concrete skip is filled and a concreting region in which the concrete skip is emptied. On the other hand, greater oscillating movements of the suspended load and thus a corresponding hazard potential occur as concentration decreases or also with insufficient experience with the respective crane type if the crane operator does not operate the operating levers or operating elements of the crane sensitively enough.

It has already been proposed to counteract the problem of unwanted oscillating movements to provide the control apparatus of the crane with oscillation damping devices that intervene in the control by means of control modules and influence the control of the drive devices, for example, prevent or lessen accelerations that are too large of a drive device due to too fast or too strong an actuation of the operating lever or restrict specific travel speeds with larger loads or intervene in a similar manner in the travel movements to prevent too great an oscillation of the lifting hook.

Such oscillation damping devices for cranes are known in various embodiments, for example by controlling the slewing gear drive, the luffing drive, and the trolley drive in dependence on specific sensor signals, for example inclination signals and/or gyroscope signals. Documents DE 20 2008 018 260 U1 or DE 10 2009 032 270 A1, for example, show known load oscillation damping devices at cranes and their subject matters are expressly referenced to this extent, that is, with respect to the principles of the oscillation damping device. In DE 20 2008 018 260 U1, for example, the rope angle relative to the vertical and its change in the form of the rope angle speed is measured by means of a gyroscope unit to automatically intervene in the control on an exceeding of a limit value for the rope angle speed with respect to the vertical.

Furthermore, a load oscillation damping system for maritime cranes is known from the Liebherr company under the name "Cycoptronic" that calculates load movements and influences such as wind in advance and automatically initiates compensation movements on the basis of this advance calculation to avoid any swaying of the load. Specifically with this system, the rope angle with respect to the vertical and its changes are also detected by means of gyroscopes to intervene in the control in dependence on the gyroscope signals.

With long, slim crane structures having an ambitious payload configuration as is in particular the case with revolving tower cranes, it has, however, proved difficult at times with conventional oscillation damping devices to intervene in the control of the drives in the correct manner to achieve the desired oscillation-damping effect. Dynamic effects and an elastic deformation of structural parts arise here in the region of the structural parts, in particular of the tower, when a drive is accelerated or decelerated so that interventions in the drive devices—for example a deceleration or acceleration of the trolley drive or of the slewing gear—do not directly influence the oscillation movement of the lifting hook in the desired manner. On the one hand, time delays in the transmission to the hoist rope and to the lifting hook can occur due to dynamic effects in the structural parts when drives are actuated in an oscillation damping manner. On the other hand, said dynamic effects can also have excessive or even counterproductive effects on a load oscillation. If, for example, a load oscillates due to an actuation of the trolley drive to the rear towards the tower that is initially too fast and if the oscillating damping device counteracts this in that the trolley drive is decelerated, a pitching movement of the boom can occur since the tower deforms accordingly, whereby the desired oscillation damping effect can be impaired.

Starting from this, it is the underlying object of the present invention to provide an improved crane and an improved method for controlling same, to avoid the disadvantages of the prior art, and to further develop the latter in an advantageous manner. An improved oscillation damping should in particular be achieved with revolving tower cranes that takes the manifold influences of the crane structure better into account.

In accordance with the invention, said object is achieved by a crane in accordance with claim 1 and by a method in accordance with claim 15. Preferred embodiments of the inventions are the subject of the dependent claims.

It is therefore proposed not only to take account of the actual oscillation movement of the rope per se in the oscillation damping measures, but rather also the dynamics of the steel construction of the crane and its drivetrains. The crane is no longer considered an immobile rigid body that converts drive movements of the drive devices directly and identically, i.e. 1:1, into movements of the suspension point of the hoist rope. The oscillation damping device instead considers the crane as a soft structure whose steel elements such as the tower lattice and whose drivetrains demonstrate elasticity and yield properties on accelerations and takes these dynamics of the structural parts of the crane into account in the oscillation damping influencing of the control of the drive devices.

In accordance with the invention, the oscillation damping device comprises determination means for determining dynamic deformations and movements of structural elements under dynamic loads, wherein the control module of the oscillation damping device that influences the control of the drive device in an oscillation damping manner is configured to take account of the determined dynamic deformations of the structural elements of the crane on the influencing of the control of the drive devices.

The oscillation damping device therefore considers the crane structure or machine structure not as a rigid, that is infinitely stiff structure, but rather assumes an elastically deformable and/or yielding and/or relatively soft structure that permits movements and/or positional changes due to the deformations of the structural elements—in addition to the adjustment movement axes of the machine such as the boom luffing axis or the axis of rotation of the tower.

The taking into account of the movability of the machine structure as a consequence of structural deformations under load or under dynamic loads is in particular of importance with elongated, slim, and deliberately maximized structures such as revolving tower cranes with respect to the static and dynamic conditions—while taking account of the required safety properties—since here noticeable movement portions, for example for the boom and thus for the lifting hook position also occur due to the deformations of the structural elements. To be able to better counteract the oscillation causes, the oscillation damping takes account of such deformations and movements of the machine structure under dynamic loads.

Considerable advantages can hereby be achieved.

The oscillation dynamics of the structural elements are initially reduced by the regulation behavior of the control device. The oscillation is here actively damped by the travel behavior or is not even stimulated by the regulation behavior.

The steel construction is equally spared and put under less strain. Impact loads are in particular reduced by the regulation behavior.

The influence of the travel behavior can further be defined by this traveling.

The pitching oscillation can in particular be reduced and damped by the knowledge of the structural dynamics and the regulation process. The load thus behaves more calmly and no longer swings up and down later in the position of rest.

The aforesaid elastic deformations and movements of the structural elements and drivetrains and the inherent movements hereby adopted can generally be determined in different manners. In a further development of the invention, said determination means can comprise an estimation device that estimates the deformations and movements of the machine structure under dynamic loads that result in dependence on control commands input at the control station and/or in dependence on specific control actions of the drive devices and/or in dependence on specific speed and/or acceleration profiles of the drive devices while taking account of circumstances characterizing the crane structure.

Such an estimation device can, for example, access a data model in which structural parameters of the crane such as the tower height, the boom length, stiffnesses, moments of inertia of an area, and similar are stored and/or are linked to one another to then estimate on the basis of a specific load situation, that is, the weight of the load suspended at the lifting hook and the instantaneous outreach which dynamic effects, that is, deformations in the steel construction and in the drivetrains, result for a specific actuation of a drive device. The oscillation damping device can then intervene in the control of the drive devices and influence the adjustment parameters of the drive regulators of the drive devices in dependence on such an estimated dynamic effect to avoid or to reduce oscillation movements of the lifting hook and of the hoist rope.

The determination device for determining such structural deformations can in particular comprise a calculation unit that calculates these structural deformations and movements of the structural parts resulting therefrom on the basis of a stored calculation model in dependence on the control commands entered at the control station. Such a model can have a similar structure to a finite element model or can be a finite element model, with advantageously, however, a model being used that is considerably simplified with respect to a finite element model and that can, for example, be determined empirically by a detection of structural deformations under specific control commands and/or load states at the actual crane or at the actual machine. Such a calculation model can, for example, work with tables in which specific deformations are associated with specific control commands, with intermediate values of the control commands being able to be converted into corresponding deformations by means of an interpolation apparatus.

Alternatively or additionally to an estimation or calculation of the elastic deformations and dynamic movements of the structural elements, the oscillation damping device can also comprise a suitable sensor system by means of which such elastic deformations and movements of structural elements under dynamic loads are detected. Such a sensor system can, for example, comprise deformation sensors such as strain gauges at the steel construction of the crane, for example the lattice structures of the tower and/or of the boom. Alternatively or additionally, acceleration sensors and/or speed sensors can be provided to detect specific movements of structural elements such as pitching movements of the boom tip and/or rotational dynamic effects at the boom. Alternatively or additionally, inclination sensors or gyroscopes can also be provided at the tower, for example, in particular at its upper section at which the boom is supported, to detect the dynamics of the tower. For example, jerky hoisting movements result in pitching movements of the boom that are accompanied by bending movements of the tower, with a continued swaying of the tower in turn resulting in pitching sway movements of the boom, which is accompanied by corresponding lifting hook movements. Alternatively or additionally, motion sensors and/or acceleration sensors can be associated with the drivetrains to be able to detect the dynamics of the drivetrains. For example, rotary encoders can be associated with the pulley blocks of the trolley for the hoist rope and/or with the pulley blocks for a guy rope of a luffing boom to be able to detect the actual rope speed at the relevant point.

Suitable motion sensors and/or speed sensors and/or acceleration sensors are advantageously also associated with the drive devices themselves to correspondingly detect the drive movements of the drive deices and to be able to put them in relation with the estimated and/or detected deformations of the structural elements such as of the steel construction and in the drivetrains.

The oscillation damping device can in particular comprise in a further development of the invention a filter device or an observer that observes the crane reactions that are adopted with specific adjustment parameters of the drive regulators and that influences the adjustment parameters of the regulator using the observed crane reactions while taking account of predetermined principles of a dynamic model of the crane that can generally have different properties and that can be acquired by analysis and simulation of the steel construction.

Such a filter device or observation device can in particular be configured in the form of a so-called Kalman filter to which the adjustment values of the drive regulator of the crane and the crane movements, in particular the lifting hook movement, in particular its oscillation movement, are supplied as input values and which influences the adjustment values of the drive regulators accordingly from these input values using Kalman equations that model the dynamic system of the crane structure, in particular its steel elements and drivetrains, to achieve the desired oscillation damping effect.

The position of the lifting hook, in particular also its oblique pull with respect to the vertical, that is, the deflection of the hoist rope with respect to the vertical, is in particular detected by means of a suitable sensor system and is supplied to said Kalman filter. The detection device for the position detection of the lifting hook can advantageously comprise an imaging sensor system, for example a camera, that looks substantially straight down from the suspension point of the hoist rope, for example the trolley. An image evaluation device can identify the crane hook in the image provided by the imaging sensor system and can determine its eccentricity or its displacement from the image center therefrom that is a measure for the deflection of the crane hook with respect to the vertical and thus characterizes the load oscillation.

The positional sensor system can advantageously be configured to detect the load relative to a fixed global coordinate system and/or the travel control device can be configured to position the load relative to a fixed global coordinate system.

An oblique pull regulation that eliminates or at least reduces a static deformation due to the attached load can be implemented by the load position detection here. To reduce the sway dynamics or even to not even allow them to arise at all, the oscillation damping device can be configured to correct the slewing gear and the trolley chassis such that the rope is, where possible, always perpendicular to the load even when the crane inclines more and more to the front due to the increasing load torque. For example, on the lifting of a load from the ground, the pitching movement of the crane as a consequence of its deformation under the load can be taken into account and the trolley chassis can be subsequently traveled while taking account of the detected load position or can be positioned using a forward-looking estimation of the pitch deformation such that the hoist rope is in a perpendicular position above the load on the resulting crane deformation. The greatest static deformation here occurs at the point at which the load leaves the ground. An oblique pull regulation is then no longer required. In a corresponding manner, alternatively or additionally, the slewing gear can also be subsequently traveled while taking account of the detected load position and/or can be positioned using a forward-looking estimation of a transverse deformation such that the hoist rope is in a perpendicular position above the load on the resulting crane deformation.

Such an oblique pull regulation can be reactivated by the operator at a later time who can thereby use the crane as a manipulator. He can hereby reposition the load simply by pressing and/or pushing. The oblique pull regulation here attempts to follow the deflection that is caused by the operator. A manipulation control can thereby be implemented.

Said oscillation damping device can monitor the input commands of the crane operator on a manual actuation of the crane by actuating corresponding operating elements such as joysticks and the like and can override them as required, in particular in the sense that accelerations that are, for example, specified as too great by the crane operator are reduced or also that counter-movements are automatically initiated if a crane movement specified by the crane operator has resulted or would result in an oscillation of the lifting hook.

Alternatively or additionally, the oscillation damping device can also be used on an automated actuation of the crane in which the control apparatus of the crane automatically travels the load suspension means of the crane between at least two destination points along a travel path in the sense of an autopilot. In such an automatic operation in which a travel path determination module of the control apparatus determines a desired travel path, for example in the sense of a path control and an automatic travel control module of the control apparatus controls the drive regulators or drive devices such that the lifting hook is traveled along the specified travel path, the oscillation damping device can intervene in the control of the drive regulators by said travel control module to travel the crane hook free of oscillations or to damp oscillation movements.

Figure 2:
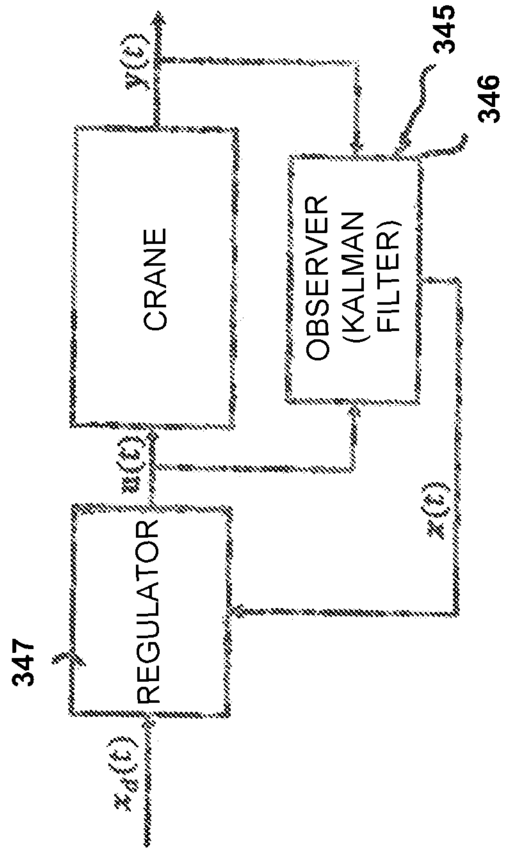
Figure 3:
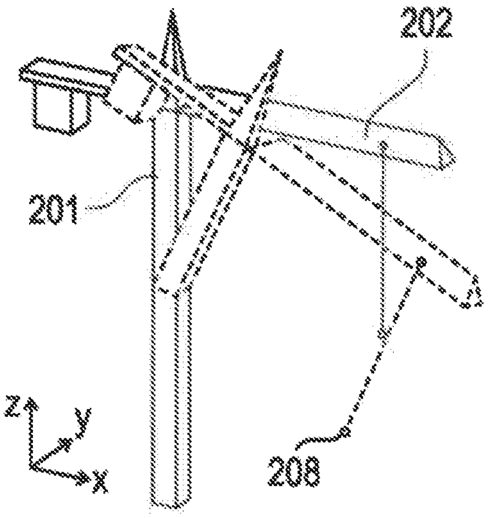
Figure 3:
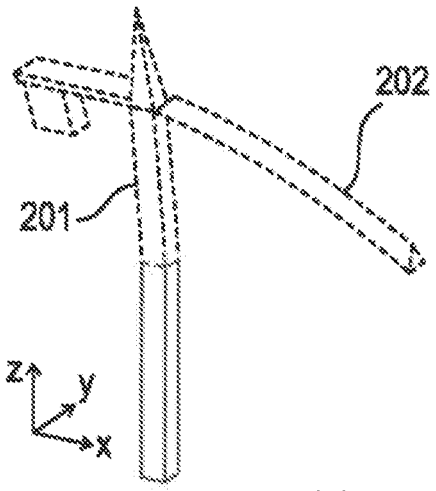
Figure 3:
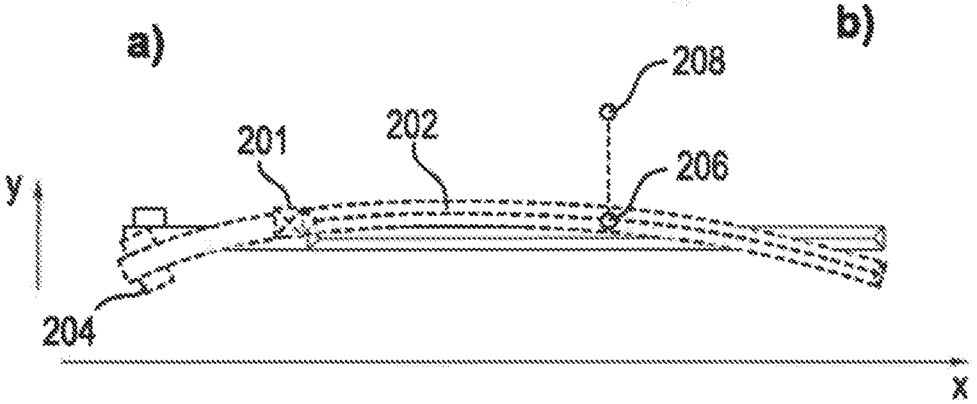
Figure 3:
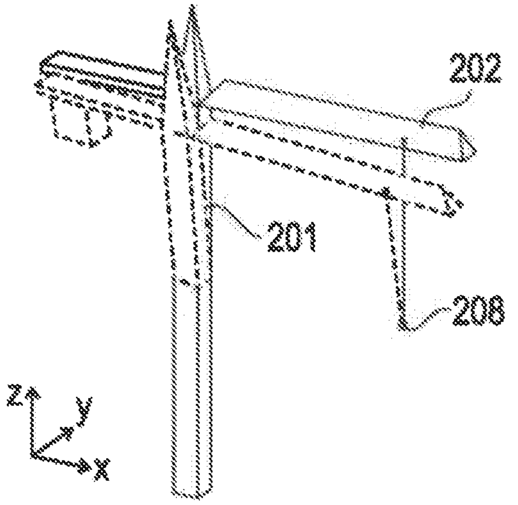
Figure 3:
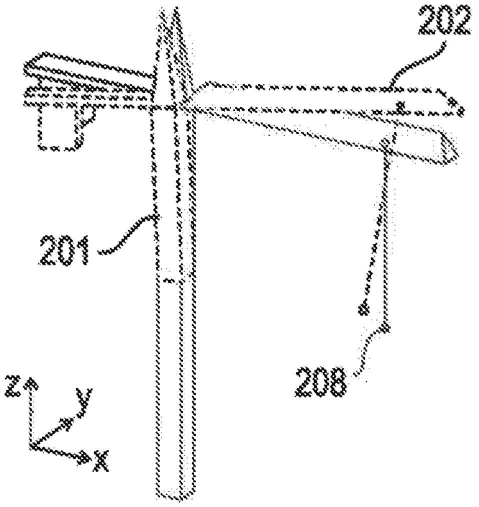

The invention will be explained in more detail in the following with reference to a preferred embodiment and to associated drawings. There are shown in the drawings:

FIG. 1: a schematic representation of a revolving tower crane in which the lifting hook position and a rope angle with respect to the vertical are detected by an imaging sensor system and in which an oscillation damping device influences the control of the drive devices to prevent oscillations of the lifting hook and of its hoist rope;

FIG. 2: a schematic representation of a Kalman filter of the oscillation damping device and the influencing of the adjustment parameters of the drive regulators carried out by it; and FIG. 3: a schematic representation of deformations and swaying shapes of a revolving tower crane under load and their damping or avoiding by an oblique pull regulation, wherein the partial view a.) shows a pitching deformation of the revolving tower crane under load and an oblique pull of the hoist rope linked thereto, the partial views b.) and c.) show a transverse deformation of the revolving tower crane in a perspective representation and in a plan view from above, and partial views d.) and e.) show an oblique pull of the hoist rope linked to such transverse deformations.

As FIG. 1 shows, the crane can be configured as a revolving tower crane. The revolving tower crane shown in FIG. 1 can, for example, have a tower 201 in a manner known per se that carries a boom 202 that is balanced by a counter-boom 203 at which a counter-weight 204 is provided. Said boom 202 can be rotated by a slewing gear together with the counter-boom 203 about an upright axis of rotation 205 that can be coaxial to the tower axis. A trolley 206 can be traveled at the boom 202 by a trolley drive, with a hoist rope 207 to which a lifting hook 208 is fastened running off from the trolley 206.

As FIG. 1 likewise shows, the crane 2 can here have an electronic control apparatus 3 that can, for example, comprise a control processor arranged at the crane itself. Said control apparatus 3 can here control different adjustment members, hydraulic circuits, electric motors, drive apparatus, and other pieces of working equipment at the respective construction machine. In the crane shown, they can, for example, be its hoisting gear, its slewing gear, its trolley drive, its boom/luffing drive—where present—or the like.

Said electronic control apparatus 3 can here communicate with an end device 4 that can be arranged at the control station or in the operator's cab and can, for example, have the form of a tablet with a touchscreen and/or joysticks, rotary knobs, slider switches, and similar operating elements so that, on the one hand, different information can be displayed by the control processor 3 at the end device 4 and conversely control commands can be input via the end device 4 into the control apparatus 3.

Said control apparatus 3 of the crane 1 can in particular be configured also to control said drive apparatus of the hoisting gear, of the trolley, and of the slewing gear when an oscillation damping device 340 detects oscillation-relevant movement parameters.

For this purpose, the crane 1 can have a detection device 60 that detects an oblique pull of the hoist rope 207 and/or deflections of the lifting hook 208 with respect to a vertical line 61 that passes through the suspension point of the lifting hook 208, i.e. the trolley 206. The rope pull angle φ can in particular be detected with respect to the line of gravity effect, i.e. the vertical 62, cf. FIG. 1.

The determination means 62 of the detection device 60 provided for this purpose can, for example, work optically to determine said deflection. A camera 63 or another imaging sensor system can in particular be attached to the trolley 206 that looks perpendicularly downwardly from the trolley 206 so that, with a non-deflected lifting hook 208, its image reproduction is at the center of the image provided by the camera 63. If, however, the lifting hook 208 is deflected with respect to the vertical 61, for example by a jerky traveling of the trolley 206 or by an abrupt braking of the slewing gear, the image reproduction of the lifting hook 208 moves out of the center of the camera image, which can be determined by an image evaluation device 64.

The control apparatus 3 can control the slewing gear drive and the trolley drive with the aid of the oscillation damping device 340 in dependence on the detected deflection with respect to the vertical 61, in particular while taking account of the direction and magnitude of the deflection, to again position the trolley 206 more or less exactly above the lifting hook 208 and to compensate or reduce oscillation movements or not even to allow them to occur.

The oscillation damping device 340 for this purpose comprises determination means 342 for determining dynamic deformations of structural elements, wherein the control module 341 of the oscillation damping device 340 that influences the control of the drive device in an oscillation damping manner is configured to take account of the determined dynamic deformations of the structural elements of the crane on the influencing of the control of the drive devices.

The determination means 342 can here comprise an estimation device 343 that estimates the deformations and movements of the machine structure under dynamic loads that result in dependence on control commands input at the control station and/or in dependence on specific control actions of the drive devices and/or in dependence on specific speed and/or acceleration profiles of the drive devices while taking account of circumstances characterizing the crane structure. A calculation unit 348 can in particular calculate the structural deformations and movements of the structural parts resulting therefrom using a stored calculation model in dependence on the control commands input at the control station.

Alternatively or additionally, the oscillation damping device 340 can also comprise a suitable sensor system 344 by means of which such elastic deformations and movements of structural elements under dynamic loads are detected. Such a sensor system 344 can, for example, comprise deformation sensors such as strain gauges at the steel construction of the crane, for example the lattice structures of the tower 201 or of the boom 202. Alternatively or additionally, acceleration sensors and/or speed sensors can be provided to detect specific movements of structural elements such as pitching movements of the boom tip or rotational dynamic effects at the boom 202. Alternatively or additionally, inclination sensors or gyroscopes can also be provided at the tower 201, for example, in particular at its upper section at which the boom is supported, to detect the dynamics of the tower 201. Alternatively or additionally, motion sensors and/or acceleration sensors can also be associated with the drivetrains to be able to detect the dynamics of the drivetrains. For example, rotary encoders can be associated with the pulley blocks of the trolley 206 for the hoist rope and/or with the pulley blocks for a guy rope of a luffing boom to be able to detect the actual rope speed at the relevant point.

As FIG. 2 shows, the oscillation damping device 340 comprises a filter device or an observer 345 that observes the crane reactions that are adopted with specific adjustment parameters of the drive regulators 347 and that influences the adjustment parameters of the regulator using the observed crane reactions while taking account of predetermined principles of a dynamic model of the crane that can generally have different properties and that can be acquired by analysis and simulation of the steel construction.

Such a filter device or observation device 345b can in particular be configured in the form of a so-called Kalman filter 346 to which the adjustment values of the drive regulators 347 of the crane and the crane movements, in particular the rope pull angle φ with respect to the vertical 62 and/or its time change or the angular speed of said oblique pull are supplied as input values and which influences the adjustment values of the drive regulators 347 accordingly from these input values using Kalman equations that model the dynamic system of the crane structure, in particular its steel elements and drivetrains, to achieve the desired oscillation damping effect.

In particular deformations and sway shapes of the revolving tower crane under load can be damped or avoided from the start by means of such an oblique pull regulation, as is shown by way of example in FIG. 3, with the partial view a.) there initially schematically showing a pitching deformation of the revolving tower crane under load as a result of a deflection of the tower 201 with the accompanying lowering of the boom 202 and an oblique pull of the hoist rope linked thereto.

The partial views b.) and c.) of FIG. 3 further show by way of example in a schematic manner a transverse deformation of the revolving tower crane in a perspective representation and in a plan view from above with the deformations of the tower 201 and of the boom 202 occurring there.

Finally, FIG. 3 shows an oblique pull of the hoist rope linked to such transverse deformations in its partial views d.) and e.).

To counteract the corresponding sway dynamics, the oscillation damping device 430 can comprise an oblique pull regulation. The position of the lifting hook 208, in particular also its oblique pull with respect to the vertical, that is, the deflection of the hoist rope 207 with respect to the vertical, is in particular detected by means of the determination means 62 and is supplied to said Kalman filter 346.

The positional sensor system can advantageously be configured to detect the load or the lifting hook 208 relative to a fixed global coordinate system and/or the oscillation damping device 430 can be configured to position the load relative to a fixed global coordinate system.

An oblique pull regulation that eliminates or at least reduces a static deformation due to the attached load can be implemented by the load position detection here. To reduce the sway dynamics or even to not even allow them to arise at all, the oscillation damping device 430 can be configured to correct the slewing gear and the trolley chassis such that the rope is, where possible, always perpendicular to the load even when the crane inclines more and more to the front due to the increasing load torque.

For example, on the lifting of a load from the ground, the pitching movement of the crane as a consequence of its deformation under the load can be taken into account and the trolley chassis can be subsequently traveled while taking account of the detected load position or can be positioned using a forward-looking estimation of the pitch deformation such that the hoist rope is in a perpendicular position above the load on the resulting crane deformation. The greatest static deformation here occurs at the point at which the load leaves the ground. An oblique pull regulation is then no longer required. In a corresponding manner, alternatively or additionally, the slewing gear can also be subsequently traveled while taking account of the detected load position and/or can be positioned using a forward-looking estimation of a transverse deformation such that the hoist rope is in a perpendicular position above the load on the resulting crane deformation.

Such an oblique pull regulation can be reactivated by the operator at a later time who can thereby use the crane as a manipulator. He can hereby reposition the load simply by pressing and/or pushing. The oblique pull regulation here attempts to follow the deflection that is caused by the operator. A manipulation control can thereby be implemented.

The invention claimed is:

1. A tower crane subject to dynamic loads during operation comprising:

a tower that supports a boom on which a trolley is displaceable, wherein one or more structural elements of the tower crane experience elastic deformations and movements in response to being subject to the dynamic loads;

a load suspension means attached to a hoist rope running from the trolley, wherein at least one of the load suspension means or the hoist rope experience oscillation movements resultant from the dynamic loads;

drive devices for moving one or more crane elements used for traveling the load suspension means;

a control apparatus for controlling the drive devices such that the load suspension means travels along a travel path; and an oscillation damping device for damping the oscillation movements of the load suspension means and/or of the hoist rope as a result of the dynamic loads, the oscillation damping device comprising:

determination means comprising a sensor system including at least one deformation sensor, the determination means for determining the elastic deformations and movements of the one or more structural elements of the tower crane under the dynamic loads during operation of the tower crane; and a control module for automatically influencing the movement of one or more of the crane elements via control of the drive devices in response to the determined elastic deformations and movements.

2. The tower crane in accordance with claim 1, wherein one of the structural elements is selected from the group consisting of the tower and the boom; and wherein the determination means are configured to determine deformations and movements of at least one of the tower or the boom during operation of the tower crane.

3. The tower crane in accordance with claim 1, wherein structural elements that experience the elastic deformations and movements include the tower and a drivetrain part; and wherein the determination means are configured to determine deformations and movements of the tower and drivetrain part during operation of the tower crane.

4. The tower crane in accordance with claim 1, wherein the determination means determines the elastic deformations and movements of the tower and one or more other structural elements;

wherein at least one deformation sensor is attached to the tower; and wherein, while the tower crane is configured to allow the tower and the one or more other structural elements to experience the elastic deformations and movements, the oscillation damping device dampens the oscillation movements of the load suspension means and/or of the hoist rope resultant from the elastic deformations and movements of the tower and the one or more other structural elements.

5. The tower crane in accordance with claim 4, wherein the determination means further comprise at least one of:

an estimation device for estimating the deformations and movements of the tower and the one or more other structural elements during operation of the tower crane on the basis of digital data of a data model describing the tower crane; or a calculation unit that calculates the deformations and movements of the tower and the one or more other structural elements on the basis of a stored calculation model in dependence on control commands input at a control station.

6. The tower crane in accordance with claim 4, wherein the sensor system further comprises a dynamic parameter sensor for detecting dynamic parameters of the tower and the one or more other structural elements.

7. The tower crane in accordance with claim 6, wherein the sensors are selected from the group consisting of:

an inclination sensor and/or acceleration sensor for detecting tower inclinations and/or tower speeds;

a rotational speed sensor and/or rotational acceleration sensor for detecting the rotational speed and/or rotational acceleration of the boom;

a pitching movement sensor for detecting pitching movements and/or pitching accelerations of the boom;

a rope speed sensor and/or rope acceleration sensor for detecting rope speeds and/or rope accelerations of the hoist rope; and a combination thereof.

8. The tower crane in accordance with claim 4 further comprising a detection device for detecting a deflection of the hoist rope and/or of the load suspension means with respect to a vertical;

wherein the control module of the oscillation damping device is further configured to influence the control of the drive devices in dependence on the determined deflection of the hoist rope and/or of the load suspension means with respect to the vertical.

9. The tower crane in accordance with claim 8 further comprising an image evaluation device;

wherein the detection device comprises an imaging sensor system; and wherein the image evaluation device is for evaluating an image provided by the imaging sensor system with respect to the position of the load suspension means in the provided image and for determining the deflection of the load suspension means and/or of the hoist rope and/or of the deflection speed with respect to the vertical.

10. The tower crane in accordance with claim 9, wherein the imaging sensor system comprises a camera configured to look substantially straight down in the region of a trolley of the hoist rope.

11. The tower crane in accordance with claim 4, wherein the oscillation damping device further comprises a filter device and/or observation device for influencing adjustment values of drive regulators for controlling the drive devices, with the filter device and/or observer device being configured to obtain the adjustment values of the drive regulators and the detected and/or estimated movements of crane elements and/or deformations and/or movements of the tower and the one or more other structural elements that occur during operation of the tower crane as input values and to influence the adjustment values of the drive regulators in dependence on the dynamically induced movements of crane elements and/or deformations of the tower and the one or more other structural elements obtained for specific adjustment values of the drive regulators.

12. The tower crane in accordance with claim 11, wherein the filter device and/or observer device is configured as a Kalman filter.

13. The tower crane in accordance with claim 12, wherein detected and/or estimated and/or calculated and/or simulated functions that characterize dynamics of the tower and the one or more other structural elements are implemented in the Kalman filter.

14. The tower crane in accordance with claim 4, wherein the oscillation damping device further comprises a position sensor system that is configured to detect the load suspension means relative to a fixed global coordinate system and/or is configured to position the load suspension means relative to a fixed global coordinate system.

15. The tower crane in accordance with claim 4, wherein the oscillation damping device further comprises an oblique pull regulator and is configured to actuate the drive devices for moving the crane elements and for traveling the load suspension means such that the hoist rope, where possible, is perpendicular to suspended load, even if the tower crane deforms due to an increasing load torque and/or due to increasing transverse forces and/or increasing transverse twisting torques.

16. The tower crane in accordance with claim 1, wherein structural elements that experience the elastic deformations and movements include the tower and drivetrain parts;

wherein at least one of the drivetrain parts is selected from the group consisting of slewing gear parts and trolley drive parts; and wherein the determination means are configured to determine deformations and/or movements of the tower and drivetrain parts during operation of the tower crane.

17. A method comprising:

controlling drive devices of a tower crane subject to dynamic loads during operation for moving one or more crane elements used for traveling a load suspension means along a travel path, the load suspension means attached to a hoist rope running from a trolley displaceable along a boom supported by a tower of the tower crane; and damping oscillation movements of the load suspension means and/or of the hoist rope resulting from the dynamic loads;

wherein the damping comprises:

determining elastic deformations and movements of the tower and one or more other structural elements of the tower crane in response to being subject to the dynamic loads that occur during operation of the tower crane; and automatically influencing the movement of one or more of the crane elements via control of the drive devices in response to the determined deformations and movements;

wherein a control apparatus performs the controlling;

wherein an oscillation damping device performs the damping;

wherein a determination means comprising a sensor system including at least one deformation sensor attached to the tower performs the determining;

wherein a control module performs the automatically influencing; and wherein, while the tower crane is configured to allow the tower and the one or more other structural elements to experience the elastic deformations and movements, the step of dampening dampens the oscillation movements of the load suspension means and/or of the hoist rope resultant from the elastic deformations and movements of the tower and the one or more other structural elements.

18. The method in accordance with claim 17, wherein the oscillation damping device comprises a Kalman filter to which adjustment values of drive regulators are supplied as input values for controlling the drive devices and crane movements and/or deformations and/or dynamically induced movements of the tower and the one or more other structural parts adopted with adjustment values of the drive regulators are supplied as input values, with the Kalman filter performing an influencing of the adjustment values of the drive regulators in dependence on the input values.

* * * * *